(12) United States Patent
Hayes

(10) Patent No.: US 9,216,697 B1
(45) Date of Patent: Dec. 22, 2015

(54) VEHICLE VAULT ASSEMBLY

(71) Applicant: Kelly Hayes, Manhattan Beach, CA (US)

(72) Inventor: Kelly Hayes, Manhattan Beach, CA (US)

( * ) Notice: Subject to any disclaimer, the term of this patent is extended or adjusted under 35 U.S.C. 154(b) by 27 days.

(21) Appl. No.: 14/096,182

(22) Filed: Dec. 4, 2013

(51) Int. Cl.
  B65D 5/14 (2006.01)
  B60R 7/08 (2006.01)
  E05B 65/00 (2006.01)
  E05G 1/026 (2006.01)
  E05G 1/04 (2006.01)

(52) U.S. Cl.
  CPC ............. *B60R 7/087* (2013.01); *E05B 65/0075* (2013.01); *E05G 1/026* (2013.01); *E05G 1/04* (2013.01)

(58) Field of Classification Search
  CPC ....... E05G 1/026; E05G 1/04; E05B 65/0075; B60R 7/087
  USPC ...................................................... 296/37.14
  See application file for complete search history.

(56) References Cited

U.S. PATENT DOCUMENTS

| 3,527,176 | A | | 9/1970 | Losapio |
| 4,522,442 | A | * | 6/1985 | Takenaka ..................... 296/37.1 |
| 4,524,904 | A | | 6/1985 | Masse et al. |
| 4,926,762 | A | | 5/1990 | Paul |
| D325,125 | S | | 4/1992 | Paul |
| 5,636,890 | A | * | 6/1997 | Cooper ........................ 296/37.1 |
| 5,687,895 | A | * | 11/1997 | Allison et al. ................ 224/542 |
| 5,778,805 | A | | 7/1998 | Green |
| 7,183,903 | B2 | * | 2/2007 | Nicolson et al. ......... 340/426.36 |
| 7,597,372 | B2 | * | 10/2009 | Nagamoto et al. ......... 296/37.14 |
| 8,020,416 | B2 | | 9/2011 | Talmage et al. |
| 8,854,180 | B2 | * | 10/2014 | Bacarella ....................... 340/5.6 |
| 2008/0098939 | A1 | * | 5/2008 | Kalous et al. ................... 109/52 |

* cited by examiner

*Primary Examiner* — Pinel Romain

(57) ABSTRACT

A vehicle vault assembly safely and discreetly stores valuables within a motor vehicle. The assembly includes a vehicle having a horizontal deck. A well extends downwardly into the deck. A vault is positionable within the well. The vault includes a housing and a lid. The housing has a bottom wall and a perimeter wall attached to and extending upwardly from the bottom wall. The bottom wall and the perimeter wall define an interior space of the housing configured to store valuables therein. An upper edge of the perimeter wall defines an access opening into the interior space of the housing. The lid is positionable over the upper edge of the perimeter wall to selectively close the access opening. A locking mechanism selectively secures the lid to the housing.

3 Claims, 3 Drawing Sheets

VEHICLE VAULT ASSEMBLY

BACKGROUND OF THE DISCLOSURE

Field of the Disclosure

The disclosure relates to security vault devices and more particularly pertains to a new security vault device for safely and discreetly storing valuables within a motor vehicle.

SUMMARY OF THE DISCLOSURE

An embodiment of the disclosure meets the needs presented above by generally comprising a vehicle having a horizontal deck. A well extends downwardly into the deck. A vault is positionable within the well. The vault includes a housing and a lid. The housing has a bottom wall and a perimeter wall attached to and extending upwardly from the bottom wall. The bottom wall and the perimeter wall define an interior space of the housing configured to store valuables therein. An upper edge of the perimeter wall defines an access opening into the interior space of the housing. The lid is positionable over the upper edge of the perimeter wall to selectively close the access opening. A locking mechanism selectively secures the lid to the housing.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
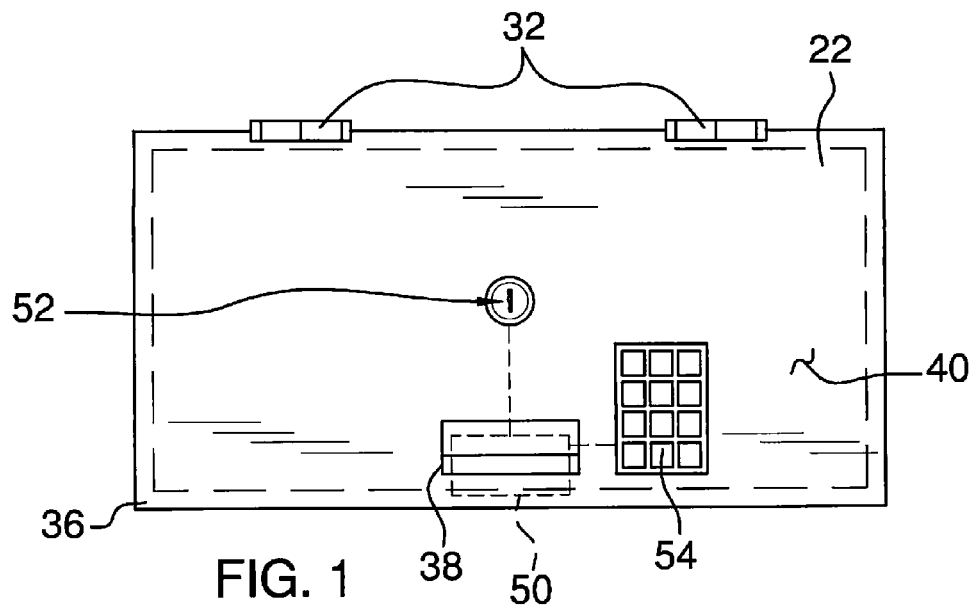
FIG. 1 is a top view of a vehicle vault assembly according to an embodiment of the disclosure.
Figure 2:
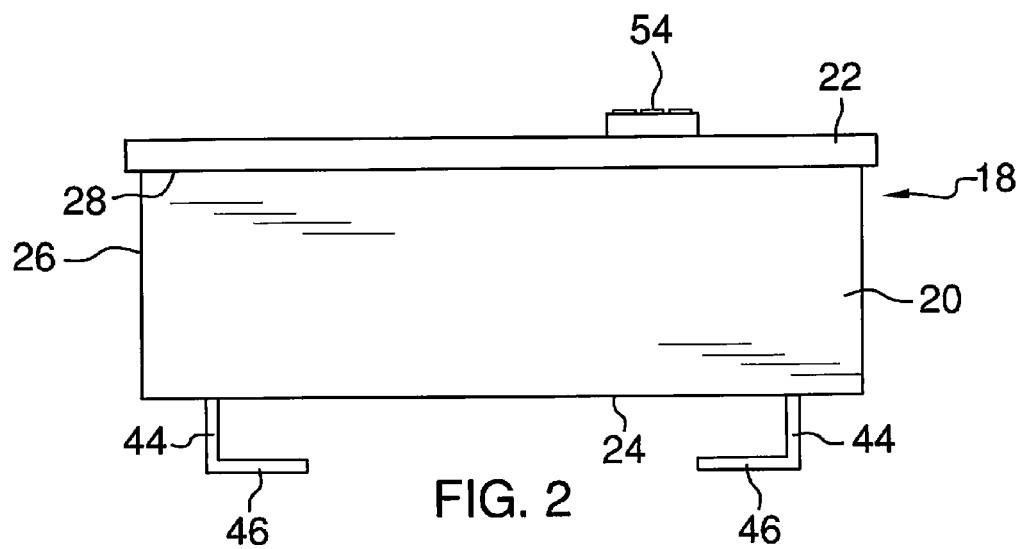
FIG. 2 is a side view of an embodiment of the disclosure.
Figure 3:
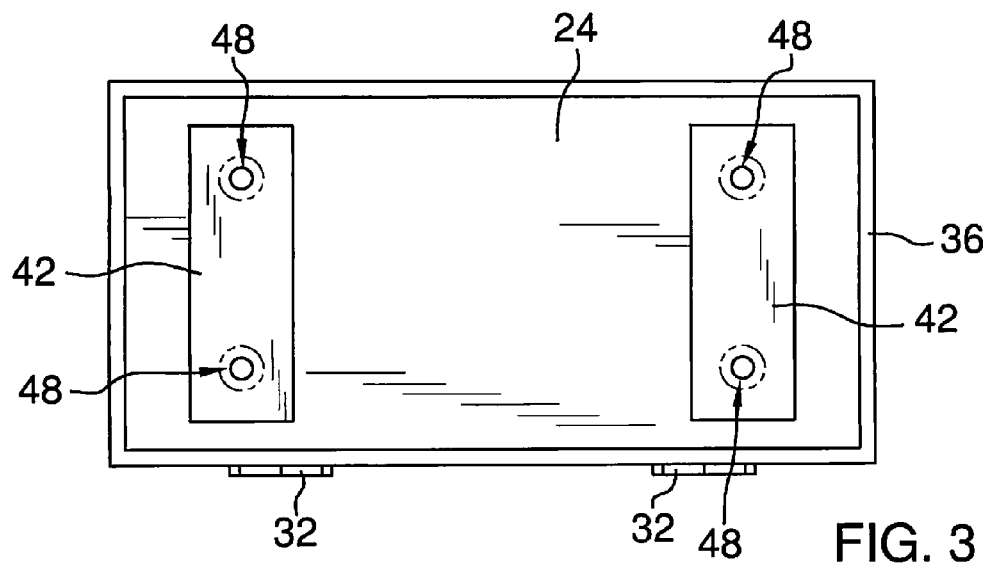
FIG. 3 is a bottom view of an embodiment of the disclosure.
Figure 4:
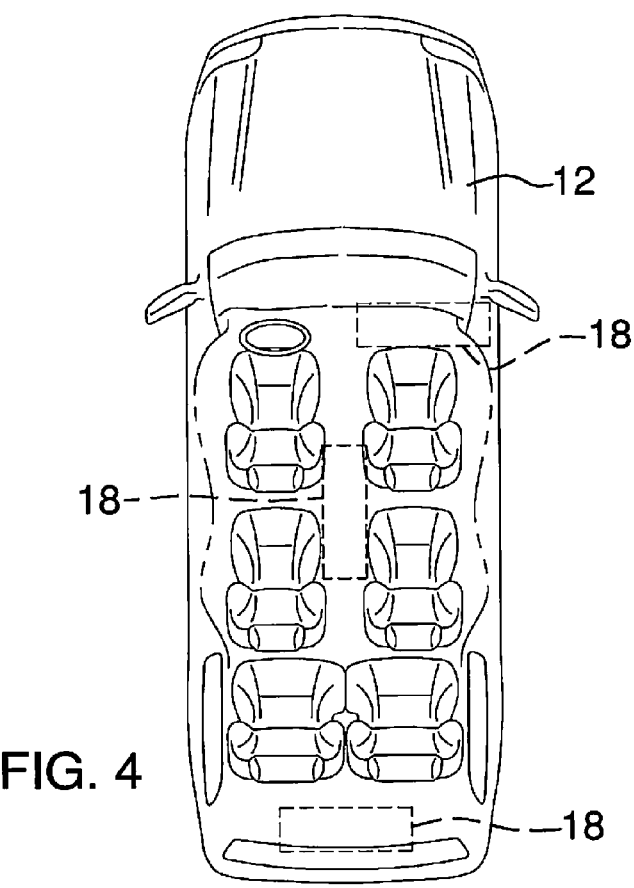
FIG. 4 is a top view of an embodiment of the disclosure.
Figure 5:
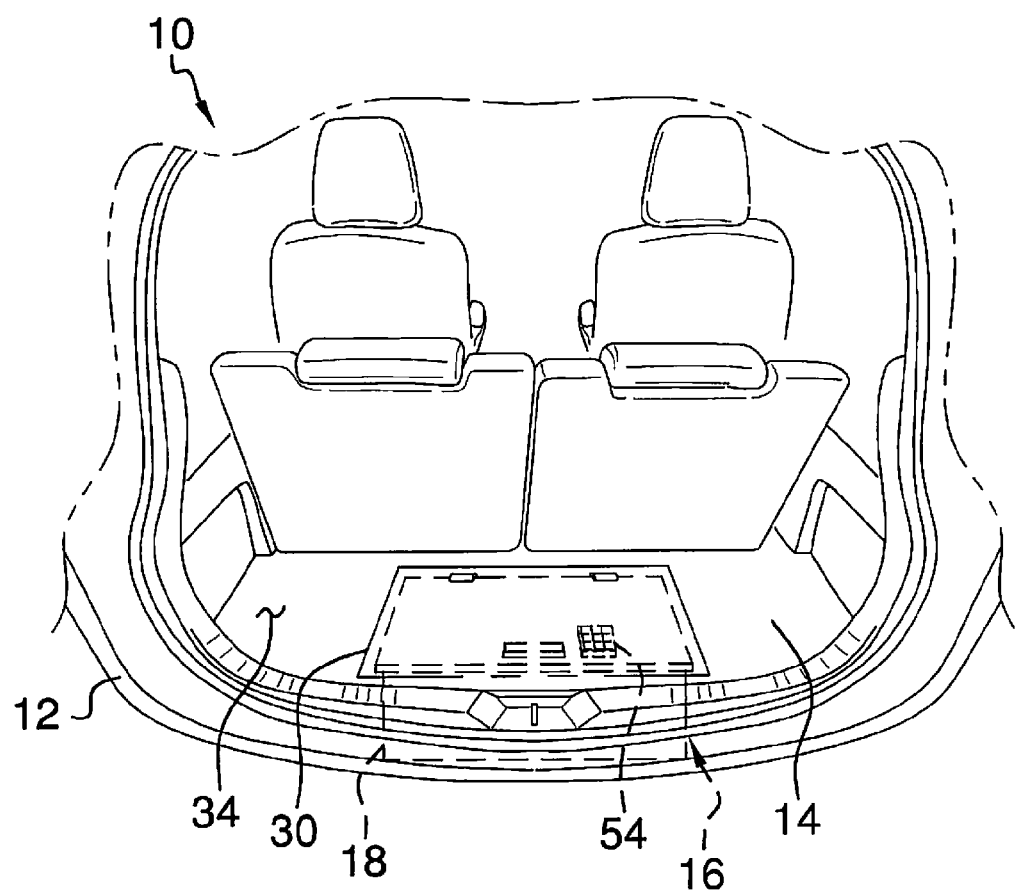
FIG. 5 is a top front side perspective view of an embodiment of the disclosure.

With reference now to the drawings, and in particular to FIGS. 1 through 5 thereof, a new security vault device embodying the principles and concepts of an embodiment of the disclosure and generally designated by the reference numeral 10 will be described.

As best illustrated in FIGS. 1 through 5, the vehicle vault assembly 10 generally comprises a vehicle 12 that is generally conventional and has a horizontal deck 14. The vehicle 12 may be an SUV or the like having a hatchback-style body. A well 16 extends downwardly into the deck 14. A vault 18 is positionable within the well 16. The vault 18 includes a housing 20 and a lid 22. The housing 20 has a bottom wall 24 and a perimeter wall 26 attached to and extending upwardly from the bottom wall 24. The bottom wall 24 and the perimeter wall 26 define an interior space of the housing 20 configured to store valuables therein. The vault 18 is sized so that it larger than a standard glove box in a vehicle and is able to hold a laptop, briefcase, purse or other similarly-sized object. An upper edge 28 of the perimeter wall 26 defines an access opening into the interior space of the housing 20. The vault 18 is constructed from a durable material, such as steel, hard plastic or the like. A covering 30, such as a floor mat, floor board or the like is positionable over the well 16 to allow the vault 18 to be discreetly stored within the well 16 so that the presence of the vault 18 is not immediately apparent to a casual observer.

The lid 22 is positionable over the upper edge 28 of the perimeter wall 26 to selectively close the access opening. A pair of hinges 32 couples the lid 22 to the perimeter wall 26. The hinges 32 selectively pivot the lid 22 between an open position exposing the access opening and a closed position closing the access opening. The lid 22 is substantially flush with respect to an upper surface 34 of the deck 14 of the vehicle 12 when the lid 22 is in the closed position and the vault 18 is positioned within the well 16. The lid 22 includes a lip 36. The lip 36 extends outwardly from the upper edge 28 of the perimeter wall 26 when the lid 22 is in the closed position. The lip 36 may extend a full length around the access opening when the lid 36 is in the closed position. A handle 38 is coupled to the vault 18. The handle 38 may be positioned on an upper surface 40 of the lid 22.

A pair of mounting brackets 42 is coupled to the housing 20. The mounting brackets 42 are configured for mounting the vault 18 to the vehicle 12. Each of the mounting brackets 42 has a first flange 44 coupled to the bottom wall 24 of the housing 20 and a second flange 46 extending outwardly from the first flange 44. The first flange 44 is positioned transversely relative to the second flange 46. Each of the second flanges 46 extends inwardly toward each other. A plurality of holes 48 is positioned in each of the second flanges 46. Each of the holes 48 is configured to receive a fastener therethrough to mount the vault 18 to the vehicle 12.

A locking mechanism 50 selectively secures the lid 22 to the housing 20 in a conventional manner. The locking mechanism 50 comprises a slot 52 configured for receiving a key wherein manipulation of the key selectively engages and disengages the locking mechanism 50. The slot 52 is generally conventional and may extend into the lid 22. Alternatively, the locking mechanism 50 may comprise a keypad 54. The keypad 54 is also generally conventional and configured for receiving a security code wherein the keypad 54 selectively engages and disengages the locking mechanism 50. The keypad 54 may be positioned on an upper surface 40 of the lid 22. Alternatively, the locking mechanism 50 may comprise both of the slot 52 and the keypad 54 such that either the key or the security code may be used to selectively engage and disengage the locking mechanism 50.

In use, as stated above and shown in the Figures, the vault 18 is positioned within the well 16 of the deck 14 and mounted to the vehicle 12 using mounting brackets 42. Valuables are positioned within the interior space of the housing 20. The lid 22 is pivoted to the closed position and the locking mechanism 50 selectively engaged to lock the valuables within the vault 18. The covering 30 is positioned over the well 16 to discreetly store the valuables within the well 16. When access to the vault 18 is desired, the covering 30 is removed to expose the well 16. Such allows the user to enter the security code or manipulate the key within the slot 52 to selectively disengage the locking mechanism 50. The user is then able to retrieve the valuables stored within the vault 18 when needed. In this manner, the assembly 10 discreetly and securely stores valuables within the vehicle 12 in an attempt to help prevent theft of the user's valuables.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A vehicle vault assembly comprising:
    a vehicle having a horizontal deck, a well extending downwardly into said deck;
    a vault being positionable within said well, said vault including a housing and a lid, said housing having a bottom wall and a perimeter wall attached to and extending upwardly from said bottom wall, said bottom wall and said perimeter wall defining an interior space of said housing configured to store valuables therein, an upper edge of said perimeter wall defining an access opening into said interior space of said housing, said lid being positionable over said upper edge of said perimeter wall to selectively close said access opening; and
    a locking mechanism selectively securing said lid to said housing, said locking mechanism comprising a slot configured for receiving a key wherein manipulation of the key selectively engages and disengages said locking mechanism, said locking mechanism comprising a keypad, said keypad being configured for receiving a security code wherein said keypad selectively engages and disengages said locking mechanism.

2. The assembly of claim 1, further comprising said locking mechanism comprising a keypad, said keypad being configured for receiving a security code wherein said keypad selectively engages and disengages said locking mechanism.

3. The assembly of claim 2, further comprising:
    a pair of hinges coupling said lid to said perimeter wall, said hinges selectively pivoting said lid between an open position exposing said access opening and a closed position closing said access opening;
    said lid including a lip, said lip extending outwardly from said upper edge of said perimeter wall when said lid is in the closed position, said lip extending a full length around said access opening when said lid is in the closed position;
    a handle coupled to said vault, said handle being positioned on an upper surface of said lid;
    a pair of mounting brackets coupled to said housing, said mounting brackets being configured for mounting said vault to said vehicle, each of said mounting brackets having a first flange coupled to said bottom wall of said housing and a second flange extending outwardly from said first flange, said first flange being positioned transversely relative to said second flange, each of said second flanges extending inwardly toward each other;
    a plurality of holes positioned in each of said second flanges, each of said holes being configured to receive a fastener therethrough to mount said vault to said vehicle;
    wherein said slot extends into said lid; and
    wherein said keypad is positioned on said upper surface of said lid.

\* \* \* \* \*